United States Patent

Coispeau et al.

[11] Patent Number: 5,380,363
[45] Date of Patent: Jan. 10, 1995

[54] PIGMENT COMPOSITION

[75] Inventors: Gerard Coispeau, Louviers, France; John D. Schofield, Bury, United Kingdom

[73] Assignee: Francolor Pigments SA, Rieux, France

[21] Appl. No.: 133,129

[22] PCT Filed: Feb. 15, 1993

[86] PCT No.: PCT/GB93/00317
§ 371 Date: Nov. 9, 1993
§ 102(e) Date: Nov. 9, 1993

[87] PCT Pub. No.: WO93/16137
PCT Pub. Date: Aug. 19, 1993

[30] Foreign Application Priority Data

Feb. 13, 1992 [GB] United Kingdom ............... 9202989

[51] Int. Cl.$^6$ ................. C09B 45/01; C09B 41/00
[52] U.S. Cl. ................................. 106/496; 106/493
[58] Field of Search ......................... 106/493, 496

[56] References Cited

U.S. PATENT DOCUMENTS

| 3,778,287 | 12/1973 | Stansfield et al. | 106/496 |
| 3,996,059 | 12/1976 | Stansfield et al. | 106/413 |
| 4,334,932 | 6/1982 | Roueche | 524/191 |

FOREIGN PATENT DOCUMENTS

| 0039307 | 11/1981 | European Pat. Off. |
| 0208041 | 1/1987 | European Pat. Off. |
| 2119583 | 8/1972 | France |
| 584578 | 9/1933 | Germany |
| 55-9654 | 1/1980 | Japan |
| 63-120764 | 5/1988 | Japan |
| 63-225668 | 9/1988 | Japan |
| 1-104663 | 4/1989 | Japan |

Primary Examiner—Mark L. Bell
Assistant Examiner—Scott L. Hertzog
Attorney, Agent, or Firm—Wenderoth, Lind & Ponack

[57] ABSTRACT

A process for the manufacture of an azo metal salt pigment, wherein a transparent or translucent alkaline aqueous solution of a resin and a dispersant of formula (1) or formula (3) is added to an azo compound, said formula (1) being $$YCO-OM \qquad (1)$$

wherein
  YCO is the residue of a polyester derived from a hydroxycarboxylic acid, and
  M is H, a metal or optionally substituted ammonium, and said formula (3) being $$YCO-Z-R \qquad (3)$$

wherein
  Z is a divalent bridging group containing an oxygen or a nitrogen atom through which Z is attached to the carbonyl group
  R is a primary, secondary or tertiary amino group or a salt thereof with an acid, or a quaternary ammonium salt group, and
  YCO is as herein defined.

7 Claims, No Drawings

PIGMENT COMPOSITION

This specification describes an invention relating to a process for the manufacture of azo metal salt pigments, also known as lake or toner pigments, by incorporating polymeric dispersing agents during the manufacturing process.

Processes for the manufacturing of azo metal salt pigments such as CI Pigment Red 48 (also known as 2B Toner or Permanent Red 2B), CI Pigment Red 53 (also known as Red Lake C or Lake Red C) and CI Pigment Red 57 (also known as 4B Toner, Lithol Rubine, Rubine Toner or Permanent Red 4B) are well known. There are three main stages:
1 formation of the azo compound;
2 resination to improve the transparency and dispersibility of the pigment; and
3 laking, i.e. forming the metal salt of the pigment.

Preparation of the azo compound involves diazotisation of an amine, such as a toluidene derivative, and coupling of the diazotised amine onto a naphthol derivative, such as 2-naphthol or 2-hydroxy-3-naphthoic acid.

Resination is generally achieved by the addition of an aqueous solution of a high acid value resin, such as a rosin. Rosins are mainly mixtures of $C_{20}$ fused-ring monocarboxylic acids typified by levopimaric and abietic acids. A more detailed description of rosins and other natural resins is given in "Encyclopaedia of Chemical Technology", Third Edn., ed. Kirk-Othmer, vol. 20, pp. 197-206. The point at which the resin is added during in the manufacturing process will depend on the properties required of the final pigment, see American Inkmaker, December 1986, pp. 30-33.

Laking is generally achieved by the addition of a water-soluble inorganic salt of the metal to the resinated pigment. It is also well known that heat treatments subsequent to the laking stage can influence transparency, strength and intensity of the final pigment.

British Patent No. 1,342,746 discloses the use of a compound of the formula:

YCO—OM  (1)

wherein
YCO is the residue of polyester; and
M is H, a metal or optionally substituted ammonium as a dispersant for dispersing lake or toner pigments in organic liquids. The polyester is derived either from a hydroxycarboxylic acid of the formula:

HO—X—COOH  (2)

wherein
X is a divalent saturated or unsaturated aliphatic radical containing at least 8 carbon atoms in which there are at least 4 carbon atoms between the hydroxy and carboxylic acid groups, or, from a mixture of a hydroxycarboxylic acid of the formula (2) and a carboxylic acid which is free from hydroxy groups.

British Patent 1,373,660 discloses the use of a compound of the formula:

YCO—Z—R  (3)

wherein

Z is a divalent bridging group containing an oxygen or a nitrogen atom through which it is attached to the carbonyl group,
R is a primary, secondary or tertiary amino group or a salt thereof with an acid or a quaternary ammonium salt group, and
YCO is the residue of the polyester derived from the hydroxycarboxylic acid of the formula (1): as a dispersant for dispersing lake or toner pigments in organic liquids. The patents also disclose the use of these dispersions in the production of gravure printing inks.

As the dispersants of the formulae (1) and (3) are widely used in the dispersion of azo metal salt pigments, it would be desirable to incorporate them in the pigment. However, they are insoluble in water and cannot, therefore, be easily incorporated into the aqueous based processes used in the manufacture of azo metal salt pigments. It has now been found that these dispersants are sufficiently compatible with a basic aqueous solution of an acid resin to allow the preparation of a clear or translucent solution of the dispersants in the resin solution, which can be readily incorporated into the pigment at the resination stage, in place of the simple aqueous solution of the resin alone, to give an azo metal salt pigment which exhibits superior brightness, strength, gloss and/or flow in organic media, such as paints and inks.

In the process of the present invention, the azo metal salt pigment is obtained by laking, with a metal, a monoazo pigment formed from toluidine derivative such as 1-amino-5-methylbenzene-2-sulfonic acid (p-toluidine-m-sulfonic acid), 1-amino-4-methyl-5-chlorobenzene-m-sulfonic acid or 1-amino-4-chloro-5-methylbenzene-2-sulfonic acid as a diazo component and 2-naphthol or 2-hydroxy-3-naphthoic acid as a coupling component. The metal used for the above laking includes Ca, Ba, Sr, Mn, Zn, Al, Mg and Fe.

The dispersant of the formula (1) used in the present invention will be detailed hereinafter.

The salts of the polyesters can be either salts of the polyesters with metal atoms or salts with bases such as ammonia or organic derivatives thereof. The metal salts can conveniently be obtained, for example, by heating the polyester with an oxide, hydroxide or carbonate of the metal at elevated temperatures, for example at temperatures in the region of 200° C., the reaction being preferably carried out in an inert atmosphere. As examples of the salt metals there may be mentioned alkali metals such as lithium, sodium and potassium, alkaline earth metals such as calcium and barium, and magnesium, lead, zinc and copper.

The amine salts can themselves be obtained, for example, by dissolving the ammonia or the amine in the polyester optionally at elevated temperatures, optionally the presence of an organic liquid such as a petroleum fraction. As examples of said amines there may be mentioned alkylamines in particular lower alkylamines such as methylamine, diethylamine and triethylamine; arylamines preferably of the benzene series such as aniline, toluidene and anisidine; tetraalkylammonium hydroxides such as tetraethylammonium hydroxide; di- and poly-amines in particular di- and poly-lower alkylamines such as ethylenediamine and triethylene tetramine; and guanidine and derivatives thereof such as N,N'-diphenylguanidine. Throughout this specification the term "lower alkyl" denotes alkyl radicals containing up to 4 carbon atoms.

In the said hydroxycarboxylic acids the radical represented by X preferably contains 12 to 20 carbon atoms, and it is further preferred that there are between 8 and 14 carbon atoms between the carboxylic acid and hydroxy groups. It is also preferred that the hydroxy group is a secondary hydroxy group.

As specific examples of such hydroxycarboxylic acids there may be mentioned ricinoleic acid, a mixture of 9- and 10-hydroxystearic acids (obtained by sulphation of oleic acid followed by hydrolysis), and 12-hydroxystearic acid, and especially the commercially available hydrogenated castor oil fatty acid which contains, in addition to 12-hydroxystearic acid minor amounts of stearic acid and palmitic acid.

The carboxylic acids which can be used in conjunction with the hydroxycarboxylic acids to obtain the polyesters are preferably carboxylic acids of saturated or unsaturated aliphatic compounds, particularly alkyl and alkenyl carboxylic acids containing a chain of from 8 to 20 carbon atoms. As examples of such acids there may be mentioned lauric acid, palmitic acid, stearic acid and oleic acid.

The dispersant of the formula (3) used in the present invention will be detailed hereinafter.

The divalent bridging group represented by Z is preferably of the formula

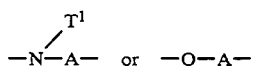

wherein $T^1$ is a hydrogen atom or an alkyl radical and

A is an alkylene or hydroxy alkylene radical containing from 2 to 6 carbon atoms.

As examples of the radicals represented by $T^1$ there may be mentioned methyl, ethyl, n-propyl, n-butyl and octadecyl. As examples of the radicals represented by A there may be mentioned ethylene, trimethylene, tetramethylene, hexamethylene and beta-hydroxytrimethylene.

The primary, secondary and tertiary amino groups represented by R are preferably of the formula

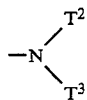

wherein $T^2$ and $T^3$ are each independently hydrogen, alkyl, substituted alkyl or cycloalkyl. The salts of the said amino groups are salts with coloured or colourless acids.

The quaternary ammonium groups represented by R are preferably of the formula:

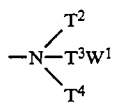

wherein $T^4$ has the same values as $T^2$ and can be the same or different, and $W^1$ is a colourless or coloured anion.

As examples of the radicals represented by $T^2$, $T^3$ and $T^4$ there may be mentioned alkyl such as methyl, ethyl, n-propyl, n-butyl and octadecyl, hydroxy lower alkyl such as beta-hydroxyethyl and cyclohexyl.

The acids used to form salts with the amino groups or which contain the anion $W^1$ can be any inorganic acid or colourless or coloured organic acid, such as hydrochloric acid, sulphuric acid, acetic acid, propionic acid, formic acid, methane sulphonic acid, benzene sulphonic acid, benzoic acid or an organic dyestuff containing at least one sulphonic acid or carboxylic acid group, in particular azo, anthraquinone or phthalocyanine, dyestuffs containing at least one sulphonic or carboxylic acid group such as are described in for example the third edition of the Colour Index which was published in 1971.

According to a further feature of the invention, R represents a primary, secondary or tertiary amino group and Z is attached to the carbonyl group through a nitrogen atom which comprises condensing together a polyester of the formula Y, COOH and a compound of the formula $R4ZR^4$ wherein Z has the meaning stated above, $R^4$ is an optionally mono substituted amino group and $R^3$ is a primary, secondary or tertiary amino group.

According to the present invention there is provided a process for the manufacture of an azo metal salt pigment wherein a clear or translucent alkaline aqueous solution of a resin and a dispersant according to the formula (1) or the formula (2) is added to the pigment during or after the coupling stage and before the laking stage.

The total amount of resin and the polyester added to the pigment is preferably from 5% to 50%, more preferably from 5% to 30% and more especially 10% to 25% by weight, based on the weight of final pigment. The ratio of resin to the polyester added is preferably from 1:4 to 4:1, more preferably from 1:2 to 4:1, and more especially from 1:2 to 2:1.

The dispersant is preferably added during the coupling stage and more especially is incorporated into the coupling component prior to or during the addition of the diazotised amine. The resin is preferably a rosin.

The invention is further illustrated by the following examples in which all parts and percentages are by weight, unless otherwise indicated.

Dispersing Agent 1

Polyester A

A mixture of 348 parts of xylene and 3350 parts of a commercial grade of 12-hydroxystearic acid (having acid and hydroxyl values of 182mg KOH/gm and 160mg KOH/gm respectively) is stirred for 22 hours at 190° to 220° C., the water formed in the reaction being separated from the xylene in the distillate which is then returned to the reaction medium. After 152 parts of water have been collected, the xylene is removed by heating at 200° C. in a stream of nitrogen. The resulting pale amber coloured liquid has an acid value of 33.0 mgs KOH/gm.

COMPARATIVE EXAMPLE 1

Solution 1 was prepared by dissolving 446 parts of 3-hydroxy-2-naphthoic acid in 7,800 parts of water. The temperature was adjusted to 5° C. by the addition of ice.

Solution 2 was prepared in an agitated vessel by dissolving 470 parts of p-toluidine-m-sulphonic acid in 6,000 parts of water. Then 30% ammonia was added until the solution was at pH 8 (ea 240 parts). The solution was filtered to remove any insoluble impurities and 695 parts of 27.5% HCl was added.

Solution 3 was prepared by dissolving 61.2 parts of Rosin in 174 parts of water and 20.8 parts of 30% NaOH solution at 50° C. followed by 391 parts of water. The resulting solution should be at about pH 10.5.

Diazotisation

The temperature of Solution 2 was adjusted to 0° C. by the addition of ice and 425 parts of a 40% $NaNO_2$ solution was added. After reaction was complete the solution was tested for excess nitrous acid and, if necessary, further sodium nitrate solution was added. Then 70 parts of 30% NaOH solution was added to adjust the solution to pH 5.

Coupling

Solution 1 was mixed with 2,000 parts of water and 48% NaOH was added to adjust to pH 10.2 (about 224 parts). Solution 3 was then added and the temperature lowered to 5° C. by the addition of ice. The diazo suspension from the diazotisation stage above was then added under vigorous agitation and 48% NaOH solution was added simultaneously to maintain the reaction medium at pH 10.2 (about 382 parts of 48% NaOH was required). After 15 hours a test should show no residual diazonium compound present. If there was some residual diazonium compound a further small amount of 3-hydroxy-2-naphtholic acid solution was added, together with 48% NaOH in order to maintain pH 10.2.

Laking and Isolation

The temperature of the suspension from the coupling stage was adjusted to 2° C. by the addition of ice, and 3,800 parts of 14.5% $CaCl_2$ solution was added. The suspension was stirred at 2° C. for 3 hours. The temperature was then increased to 45° C., and the suspension stirred for a further 2 hours. The azo metal salt pigment was isolated from the reaction medium by filtration, washed with water and dried to provide pigment.

EXAMPLE 1

The procedure for Pigment 1 was repeated except that Solution 3A was used in place of Solution 3 to give Pigment 1A.

Solution 3A was prepared by dissolving 67.2 parts of Rosin in 174 parts of water and 20.8 parts of 30% NaOH solution at 50° C. To this solution was added 47 parts of Dispersing Agent 1 at 30° C., stirring was continued until the solution was homogeneous and then 391 parts of water was added. The resulting solution should be approximately pH 10.5.

A publishing gravure ink test concerning Pigment 1 and Pigment 1A was carried out as follows.

10 Parts by weight of Pigment 1, 90 parts by weight of lime rosin varnish (containing 20% by weight of a solid content, 75% by weight of toluene and 5% of plasticizer) and 110 parts of glass beads having a diameter of 3 mm were charged into a glass bottle, and the bottle was shaken with a paint conditioner for 2 hours to give a gravure ink. Pigment 1A was also treated in the same manner as above to give a gravure ink.

Pigment 1A was excellent over Pigment 1 in viscosity when Pigments 1A and 1 were taken out from the bottles immediately after the shaking. Further, Pigment 1A did not show any increase in the viscosity with time. Moreover, Pigment 1A was excellent over Pigment 1 in transparency, clearness, tinting strength and gloss.

We claim:

1. A process for the manufacture of an azo metal salt pigment, wherein a transparent or translucent alkaline aqueous solution of a resin and a dispersant of formula (1) or formula (3) is added to an azo compound before a laking step for producing the azo metal salt pigment, said formula (1) being $$YCO-OM \qquad (1)$$

wherein
YCO is the residue of a polyester derived from a hydroxycarboxylic acid, and
M is H, a metal or optionally substituted ammonium, and said formula (3) being $$YCO-Z-R \qquad (3)$$

wherein
Z is a divalent bridging group containing an oxygen or a nitrogen atom through which Z is attached to the carbonyl group
R is a primary, secondary or tertiary amino group or a salt thereof with an acid, or a quaternary ammonium salt group, and
YCO is as herein defined.

2. A process according to claim 1, wherein the solution of a resin and a dispersant is added to the azo compound during or after a coupling step for producing the azo compound and before a laking step for producing the azo metal salt pigment.

3. A process according to claim 2, wherein the azo compound is produced by coupling p-toluidine-m-sulfonic acid to 3-hydroxynaphthoic acid.

4. A process according to claim 1, 2 or 3, wherein the polyester component of the dispersant of formula (1) or (3) is derived from either a hydroxycarboxylic acid of formula (2)

$$HO-X-COOH \qquad (2)$$

wherein X is a divalent saturated or unsaturated aliphatic radical containing at least 8 carbon atoms in which there are at least 4 carbon atoms bridging the hydroxy and carboxylic acid groups, or a mixture of a hydroxycarboxylic acid of formula (2) and a carboxylic acid which does not contain a hydroxy group.

5. A process according to claim 1, wherein the resin is rosin.

6. A process according to claim 1, wherein the total amount of the resin and the dispersant is 5 to 50% by weight based on the azo metal salt pigment.

7. A process according to claim 1, wherein the resin/dispersant weight ratio is from ¼ to 4/1.

* * * * *